(12) United States Patent
Lei et al.

(10) Patent No.: US 12,332,195 B2
(45) Date of Patent: Jun. 17, 2025

(54) METHOD FOR CALIBRATING PARAMETER ERROR OF ELECTRON PROBE MICROANALYSIS INSTRUMENT

(71) Applicants: Shanghai Institute of Measurement and Testing Technology, Shanghai (CN); Tongji University, Shanghai (CN)

(72) Inventors: Lihua Lei, Shanghai (CN); Chengming Cao, Shanghai (CN); Yingfan Xiong, Shanghai (CN); Zhangning Xie, Shanghai (CN); Xiao Deng, Shanghai (CN); Xinbin Cheng, Shanghai (CN); Yuqing Guan, Shanghai (CN); Wenzhe Zou, Shanghai (CN); Yunxia Fu, Shanghai (CN)

(73) Assignees: Shanghai Institute of Measurement and Testing Technology, Shanghai (CN); Tongji University, Shanghai (CN)

( * ) Notice: Subject to any disclaimer, the term of this patent is extended or adjusted under 35 U.S.C. 154(b) by 435 days.

(21) Appl. No.: 18/081,876

(22) Filed: Dec. 15, 2022

(65) Prior Publication Data
US 2024/0151666 A1 May 9, 2024

(30) Foreign Application Priority Data

Nov. 3, 2022 (CN) .......................... 202211365264.8

(51) Int. Cl.
*G01N 23/00* (2006.01)
*G01N 23/2202* (2018.01)
*G01N 23/2252* (2018.01)

(52) U.S. Cl.
CPC ..... *G01N 23/2252* (2013.01); *G01N 23/2202* (2013.01); *G01N 2223/079* (2013.01)

(58) Field of Classification Search
CPC .......... G01N 23/2252; G01N 23/2202; G01N 2223/079
USPC ........................................ 250/306, 307, 310
See application file for complete search history.

(56) References Cited

U.S. PATENT DOCUMENTS 8,065,094 B2 * 11/2011 Statham ............. G01N 23/2252
378/50
11,802,758 B2 * 10/2023 Deng ...................... G01D 5/266

\* cited by examiner

*Primary Examiner* — Michael Maskell
(74) *Attorney, Agent, or Firm* — Robinson & Cole LLP

(57) ABSTRACT

The present application discloses a method for calibrating a parameter error of an electron probe microanalysis instrument. A one-dimensional grating standard template is prepared based on atom lithography technology. A theoretical grating period D of the one-dimensional grating standard template is calculated. The one-dimensional grating standard template is statically placed on a stage of the electron probe microanalysis instrument. The electron probe microanalysis instrument scans the one-dimensional grating standard template on the stage, performs image acquisition and measurement on a grid distance of the one-dimensional grating standard template to obtain a grating scanning distance measurement value L, and records a magnification ratio at this time. A calibration factor K under the magnification ratio is calculated according to D and L. The present application shortens the length of the traceability chain for calibrating the instrument, reduces the error accumulation in the quantity value dissemination process.

14 Claims, 3 Drawing Sheets

METHOD FOR CALIBRATING PARAMETER ERROR OF ELECTRON PROBE MICROANALYSIS INSTRUMENT

CROSS-REFERENCE TO RELATED APPLICATION

This application claims the priority to Chinese Patent Application No. 202211365264.8, filed on Nov. 3, 2022, the disclosure of which is incorporated herein by reference in its entirety.

TECHNICAL FIELD

The present application relates to nanometer measurement technology, in particular to a method for calibrating a parameter error of an electron probe microanalysis instrument.

BACKGROUND

To achieve nanometer manufacturing, measurement comes first. With the logic gate size in the semiconductor industry gradually entering the sub-10 nm level, various three-dimensional nano functional structures with more complex shapes have been manufactured. In order to ensure the effectiveness of device performance, accurate nano metrology technology is required to accurately characterize and measure micro/nanostructures. In addition to non-imaging technologies such as X-ray and optical scattering, many microscopic technologies such as Scanning Electron Microscope (SEM), electron probe analyzer, Transmission Electron Microscope (TEM) and Atomic Force Microscope (AFM) are also used in nano metrology.

Scanning electron microscope and electron probe analyzer belong to electron probe analysis instruments. They use a finely focused electron beam to scan on a sample, and obtain a micro area surface topography image or a content value of an excited micro area element from a secondary electron signal, a backscattered electron signal, an X-ray of each element's characteristic wavelength and the like obtained from the electron beam/sample interaction. Taking SEM as an example, as the device structure becomes more three-dimensional, when using stereo photogrammetry to extend the SEM technology to three-dimensional (3D) nano measurement, in a case that the nanostructure is measured at different tilt angles of the sample relative to the beam, the height and 3D shape of the nanostructure can be calculated from the lateral displacement position of the nanostructure evaluated by the stereo SEM image set. At this time, the measurement error of the lateral position of the nanostructure by SEM will seriously affect the measurement uncertainty of the three-dimensional shape (especially when the solid angle is small). In addition, the future measurement method for three-dimensional nanostructures is fusion measurement, because no instrument has all the capabilities required to characterize the complete set of parameters of complex nanostructures (such as resolution, speed and low uncertainty level). During fusion measurement, the accurate matching between different measuring instruments is a challenging problem, because the data obtained by different instruments must be shared with each other in a complementary or collaborative way to enhance the measurement capability. Therefore, the traceability calibration and accuracy improvement of different measuring instruments become crucial.

However, the existing length accuracy level of standard materials and the limited nano length quantity value dissemination method are important reasons for limiting the calibration accuracy and consistency of electron probe analysis instruments. Taking China's current calibration specification for scanning electron microscope (JJF 1916-2021) as an example, the typical uncertainty of the used 500 nm standard template is 1.4 nm. Similarly, the typical uncertainty of the period of the 10 μm standard template used in the electron probe microanalysis instrument is about 10 nm. Due to the poor accuracy, uniformity and consistency of the above standard templates, on the one hand, they have brought large length errors. On the other hand, because the grating needs to be calibrated by a measuring instrument with a laser interferometer, there are many quantity value dissemination links and large error accumulation. The above two reasons make it difficult to improve the calibration accuracy of the existing electron probe microanalysis instrument, which is a huge obstacle for the future three-dimensional characterization of sub-10 nm device structures.

The direct traceability calibration method based on natural constants and the quantity value dissemination path are the solutions to improve the accuracy of calibration. In 2019, silicon lattice constant has been allowed to be used as a supplementary implementation of the definition of "meter" at the nano scale, which can directly calibrate instruments such as TEM to improve the accuracy of measurement. However, ordinary electron probe microanalysis instruments cannot achieve atomic resolution and cannot directly use the silicon lattice constant for direct traceability calibration. Therefore, it is necessary to explore other new direct traceability calibration methods based on natural constants.

BRIEF SUMMARY

The technical problem to be solved by the present application is to provide a method for calibrating a parameter error of an electron probe microanalysis instrument, so as to shorten the length of the traceability chain for calibrating the instrument, reduce the error accumulation in the quantity value dissemination process, improve the calibration consistency between different instruments, facilitate operation, and help to achieve the flattening of quantity value dissemination. In addition, it is also of great significance to improve the accuracy of fusion measurement based on the matching of different instruments.

In order to solve the technical problem, the method for calibrating the parameter error of the electron probe microanalysis instrument includes the following steps:

S1: preparing a one-dimensional grating standard template based on atom lithography technology, and calculating a theoretical grating period D of the one-dimensional grating standard template;

S2: statically placing the one-dimensional grating standard template on a stage of the electron probe microanalysis instrument for set time to make a test state remain stable;

S3: after the electron probe microanalysis instrument focuses clearly, scanning, by the electron probe microanalysis instrument, the one-dimensional grating standard template on the stage, performing image acquisition and measurement on a grid distance of the one-dimensional grating standard template to obtain a grating scanning distance measurement value L, and recording a magnification ratio at this time;

S4: performing calculation to obtain a calibration factor K of the electron probe microanalysis instrument under the magnification ratio:

$$K = \frac{ND}{L\cos\theta};$$

where θ is an included angle between a grating line direction and a vertical scanning direction of the electron probe microanalysis instrument; N is the number of grating periods of the one-dimensional grating standard template corresponding to the grating scanning distance measurement value L, and N is a positive integer; and S5: calibrating parameters of the electron probe microanalysis instrument under the magnification ratio by using the calibration factor K.

More preferably, the parameters of the electron probe microanalysis instrument to be calibrated include a length measurement indication error E1;

$$E1=|KL-L|/N.$$

More preferably, the parameters of the electron probe microanalysis instrument to be calibrated include a sample stage repeatability error E2:

$$E2=K\Delta\overline{S};$$

where $\Delta\overline{S}$ is an average of center distance differences; $\Delta\overline{S}$ is obtained by:
(1) finding a marking point on the one-dimensional grating standard template by using a secondary electron image under the magnification ratio, moving the marking point to a center position of a screen, and acquiring an image after focusing clearly;
(2) moving the stage for more than a set distance S along X and Y directions respectively by relatively displacing the stage, then moving the stage back for the same distance along opposite directions, and acquiring images after focusing clearly;
(3) measuring a distance between the current center position of the screen and the marking point; and
(4) repeating steps (1)-(3) for M times, and calculating an arithmetic average of M measurement results as the average $\Delta\overline{S}$ of the center distance differences, where M is a positive integer.

More preferably, M is 2, 3 or 4;

$$S>2D;$$

the magnification ratio is 80 k.

More preferably, in step S5, a linear distortion a is also calculated:

$$\alpha = \frac{\Delta L_{max}}{L_0} \times 100\%;$$

where $\Delta L_{max}$ is the maximum value of differences between a single period at the center of the screen of the electron probe microanalysis instrument and single periods at four corners of the screen, and $\Delta L_{max}$ is obtained by:
(1) adjusting the magnification ratio so that the length of a single grating period at the center of the one-dimensional grating standard template is a set ratio of the maximum image size, wherein the set ratio is 8%-12%;
(2) calculating a single grating period $L_0$ of the one-dimensional grating standard template at the center of the screen and single grating periods $L_1$, $L_2$, $L_3$ and $L_4$ at the four corners of the screen; and
(3) taking the maximum value of $|\Delta L_i|$ as $\Delta L_{max}$, $\Delta L_i = L_i - L_0$, where i=1, 2, 3, 4.

More preferably, during calibration, preferably the ambient temperature is (20±5)° C., the temperature fluctuation is less than or equal to 1° C./h, and the relative humidity is less than or equal to 75%.

More preferably, the electron probe microanalysis instrument is a scanning electron microscope, and the parameters to be calibrated include a length measurement indication error.

More preferably, the electron probe microanalysis instrument is an electron probe analyzer, and the parameters to be calibrated include a length measurement indication error and a sample stage repeatability error.

More preferably, the set time is more than 10 min.

More preferably, in step S1, a one-dimensional chromium grating standard template is prepared based on chromium atom lithography technology, and the theoretical grating period D of the standard template is calculated by using a chromium atom energy level transition frequency and a preparation process principle.

More preferably, preparing a one-dimensional chromium grating standard template based on chromium atom lithography technology includes the following steps:

S11: heating chromium powder to 1550-1650° C. under vacuum to reach a sublimation state, and leading out the chromium powder from a discharge hole to form a Cr atom beam; and S12: collimating the Cr atom beam, the collimated Cr atom beam 1 converging at a standing wave field with laser orthogonal thereto, and being deposited on a template under the action of dipole force to form the one-dimensional chromium grating standard template 4.

More preferably, in step S12, the wavelength λ of the laser 2 is 425.6 nm, the corresponding resonant transition energy level of Cr atoms is $^7S_3 \rightarrow ^7P_4^0$, the frequency of the laser 2 is adjusted to a positive or negative detuning position of a central frequency corresponding to the resonant energy level, the theoretical grating period D of the formed one-dimensional chromium grating standard template 4 is half of the wavelength λ of laser 2 and is 212.8 nm.

More preferably, in step S3, N grid distance is selected from a front of an image of a one-dimensional chromium grating standard template as a front grating scanning distance measurement value L1, and N grid distance is selected from a rear of the image of the one-dimensional chromium grating standard template as a rear grating scanning distance measurement value L2;

the grating scanning distance measurement value L is an arithmetic average of the front grating scanning distance measurement value L1 and the rear grating scanning distance measurement value L2, that is, L=(L1+L2)/2.

More preferably, in step S2, the stage is rotated and kept horizontal;

the grating line direction is made to be a front-rear direction, the electron probe microanalysis instrument is made to scan in a left-right direction, and a scanning direction of the electron probe microanalysis instrument is perpendicular to the grating line direction, that is, θ=0°.

The method for calibrating the parameter error of the electron probe microanalysis instrument provided by the present application adopts a one-dimensional grating standard template prepared based on atom lithography technology, directly uses the theoretical grating period to evaluate and calibrate the key parameters of the electron probe microanalysis instrument (the parameter evaluation and calibration process should be carried out with reference to the relevant national metrological calibration specifications), and can realize the direct evaluation and calibration of parameters such as length measurement indication error, linear distortion and sample stage repeatability error of the electron probe microanalysis instrument. The method for calibrating the parameter error of the electron probe microanalysis instrument also has the advantage of in-situ calibration at any time (for example, during the sample stage repeatability error characterization process, when measuring the distance between the current center position of the screen and the marking point, the theoretical grating period D of the one-dimensional grating standard template can be directly used for calibration, and the results will be more accurate and stable), and can achieve the advantages of direct traceability many times in some measurement processes (such as sample stage repeatability error measurement). The method for calibrating the parameter error of the electron probe microanalysis instrument shortens the length of the traceability chain for calibrating the instrument, reduces the error accumulation in the quantity value dissemination process, improves the calibration consistency between different instruments, is convenient to operate, and helps to achieve the flattening of quantity value dissemination. In addition, it is also of great significance to improve the accuracy of fusion measurement based on the matching of different instruments.

BRIEF DESCRIPTION OF THE DRAWINGS

In order to more clearly describe the technical scheme of the present application, the drawings to be used in the present application will be briefly described below. Obviously, the drawings in the following description are just some embodiments of the present application. Those skilled in the art may also obtain other drawings based on these drawings without contributing any inventive labor.

DETAILED DESCRIPTION OF THE APPLICATION

The technical schemes in the embodiments of the present application will be described below clearly and completely with reference to the drawings in the embodiments of the present application. Obviously, the described embodiments are only part of the embodiments of the present application, not all of them. Based on the embodiments of the present application, all other embodiments obtained by those skilled in the art without contributing any inventive labor still fall within the scope of protection of the present application.

Words such as "first" and "second" used in the present application do not mean any order, quantity or importance, but are only used to distinguish different components. Words such as "comprising" or "including" mean that the elements or objects appearing before the word cover the elements or objects listed after the word and their equivalents, without excluding other elements or objects. Words such as "connecting" or "connected" are not limited to physical or mechanical connection, but may include electrical connection, whether direct or indirect. Words such as "up", "down", "left" and "right" are only used to represent the relative position relationship. When the absolute position of the described object changes, the relative position relationship may also change accordingly.

It should be noted that the embodiments and features in the embodiments of the present application can be combined with each other without causing any conflict.

Embodiment 1

Figure 1:
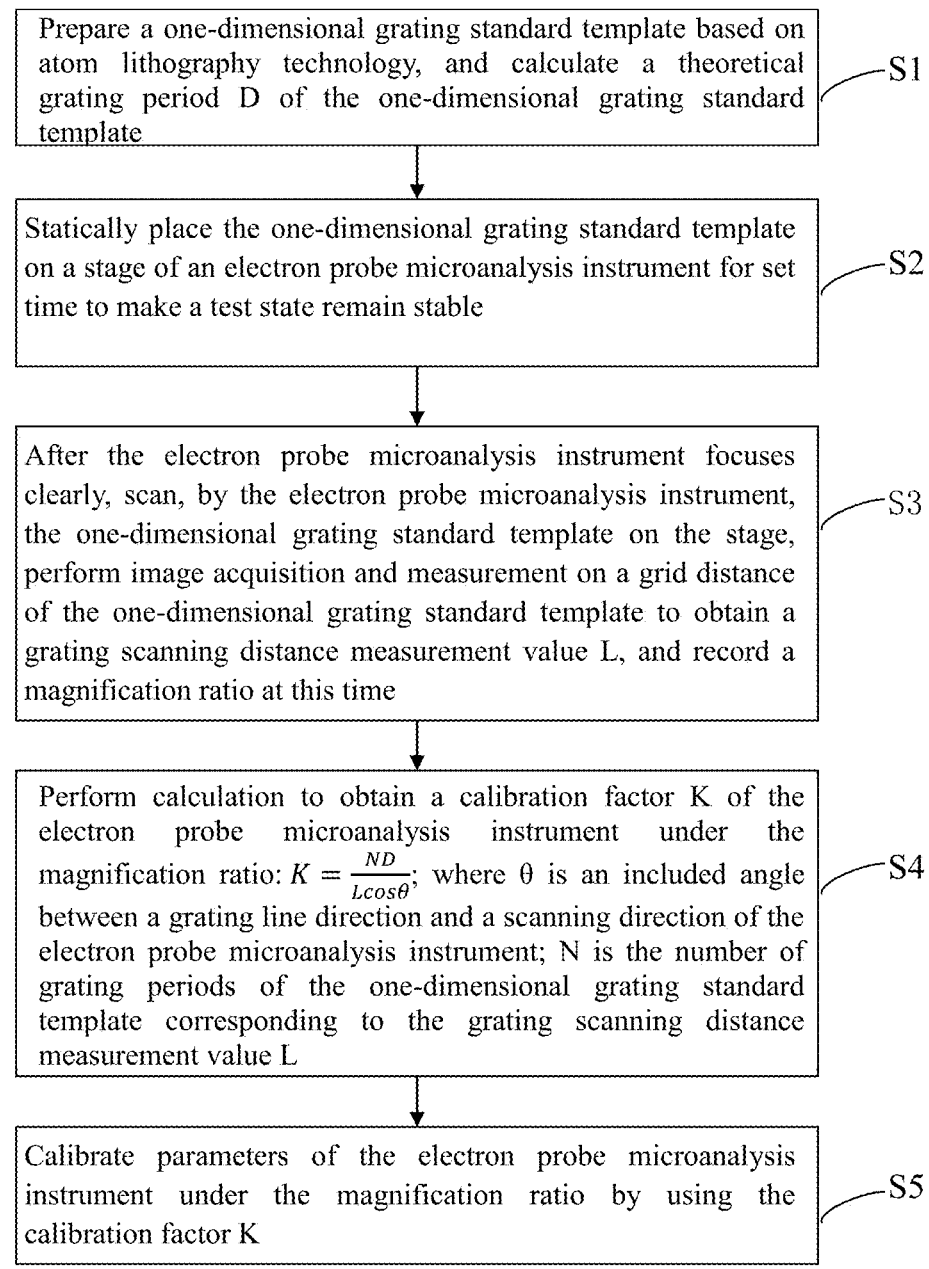
FIG. 1 illustrates a flowchart of a method for calibrating a parameter error of an electron probe microanalysis instrument according to an embodiment of the present application.

Provided is a method for calibrating a parameter error of an electron probe microanalysis instrument. Referring to FIG. 1, the method includes the following steps:

S1: preparing a one-dimensional grating standard template based on atom lithography technology, and calculating a theoretical grating period D of the one-dimensional grating standard template;

S2: statically placing the one-dimensional grating standard template on a stage of the electron probe microanalysis instrument for set time (for example, more than 10 min, such as 20 min, 30 min or 43 min) to make a test state remain stable;

S3: after the electron probe microanalysis instrument focuses clearly, scanning, by the electron probe microanalysis instrument, the one-dimensional grating standard template on the stage, performing image acquisition and measurement on a grid distance of the one-dimensional grating standard template to obtain a grating scanning distance measurement value L, and recording a magnification ratio at this time;

S4: performing calculation to obtain a calibration factor K of the electron probe microanalysis instrument under the magnification ratio:

$$K = \frac{ND}{L\cos\theta};$$

where $\theta$ is an included angle between a grating line direction and a vertical scanning direction of the electron probe microanalysis instrument; N is the number of grating periods of the one-dimensional grating standard template corresponding to the grating scanning distance measurement value L, and N is a positive integer; and S5: calibrating parameters of the electron probe microanalysis instrument under the magnification ratio by using the calibration factor K.

More preferably, the parameters of the electron probe microanalysis instrument to be calibrated include a length measurement indication error E1;

$$E1 = |KL - L|/N.$$

More preferably, the parameters of the electron probe microanalysis instrument to be calibrated include a sample stage repeatability error E2:

$$E2 = K\Delta\overline{S};$$

where $\Delta\overline{S}$ is an average of center distance differences; $\Delta\overline{S}$ is obtained by:
(1) finding a marking point on the one-dimensional grating standard template by using a secondary electron image under the magnification ratio, moving the marking point to a center position of a screen, and acquiring an image after focusing clearly;
(2) moving the stage for more than a set distance S along X and Y directions respectively by relatively displacing the stage, then moving the stage back for the same distance along opposite directions, and acquiring images after focusing clearly;
(3) measuring a distance between the current center position of the screen and the marking point; and
(4) repeating steps (1)-(3) for M times, and calculating an arithmetic average of M measurement results as the average $\Delta\overline{S}$ of the center distance differences, where M is a positive integer.

More preferably, M is 2, 3 or 4;

$$S > 2D;$$

the magnification ratio is 80 k.

More preferably, in step S5, a linear distortion a is also calculated:

$$\alpha = \frac{\Delta L_{max}}{L_0} \times 100\%;$$

where $\Delta L_{max}$ is the maximum value of differences between a single period at the center of the screen of the electron probe microanalysis instrument and single periods at four corners of the screen, and $\Delta L_{max}$ is obtained by:
(1) adjusting the magnification ratio so that the length of a single grating period at the center of the one-dimensional grating standard template is a set ratio of the maximum image size, wherein the set ratio is 8%-12%;
(2) calculating a single grating period $L_0$ of the one-dimensional grating standard template at the center of the screen and single grating periods $L_1$, $L_2$, $L_3$ and $L_4$ at the four corners of the screen; and
(3) taking the maximum value of $|\Delta L_i|$ as $\Delta L_{max}$, $\Delta L_i = L_i - L_0$, where i=1, 2, 3, 4.

More preferably, the electron probe microanalysis instrument is a scanning electron microscope, and the parameters to be calibrated include a length measurement indication error and the like.

More preferably, the electron probe microanalysis instrument is an electron probe analyzer, and the parameters to be calibrated include a length measurement indication error, a sample stage repeatability error and the like.

In the method for calibrating the parameter error of the electron probe microanalysis instrument, during calibration, preferably the ambient temperature is (20±5)° C., the temperature fluctuation is less than or equal to 1° C./h, and the relative humidity is less than or equal to 75%. In addition, when selecting the image acquisition and measurement position of the grid distance of the one-dimensional grating standard template, the holes, scratches, contamination and other positions of the grating should be avoided as far as possible.

The method for calibrating the parameter error of the electron probe microanalysis instrument in embodiment 1 prepares a one-dimensional grating standard template based on atom lithography technology, and calculates a theoretical grating period D thereof; performs calculation to obtain a calibration factor K of the electron probe microanalysis instrument under a magnification ratio according to a grating scanning distance measurement value L at the corresponding magnification ratio and the theoretical grating period D; and calibrates the electron probe microanalysis instrument under the magnification ratio by using the calibration factor K. For the grating structure prepared based on atom lithography technology, a one-dimensional grating structure with a highly accurate and reliable period can be prepared since the atom deposition position strictly corresponds to the wave valley or wave belly position of the laser standing wave field. The period of this structure strictly traces to the natural transition frequency between the transition energy levels of atoms, and the error size is generally 0.1 nm or less. It has very good intra-sample consistency and inter-sample consistency. Taking the chromium atom lithography technology as an example, after verified by the National Institute of Standards and Technology, Tongji University, China Academy of Metrology and other parties, the accuracy level is better than 0.1 nm, and it can be used directly without performing calibration within a certain range, and its scale is also adaptive to the electronic probe microanalysis instrument. Therefore, the grating has the ability to develop a direct calibration method based on natural constants, it is of great significance to improve the accuracy of the electron probe microanalysis instrument.

The method for calibrating the parameter error of the electron probe microanalysis instrument adopts a one-dimensional grating standard template prepared based on atom lithography technology, directly uses the theoretical grating period to evaluate and calibrate the key parameters of the electron probe microanalysis instrument (the parameter evaluation and calibration process should be carried out with reference to the relevant national metrological calibration specifications), and can realize the direct evaluation and calibration of parameters such as length measurement indication error, linear distortion and sample stage repeatability error of the electron probe microanalysis instrument. The method for calibrating the parameter error of the electron probe microanalysis instrument also has the advantage of in-situ calibration at any time (for example, during the sample stage repeatability error characterization process, when measuring the distance between the current center position of the screen and the marking point, the theoretical grating period D of the one-dimensional grating standard template can be directly used for calibration, and the results will be more accurate and stable), and can achieve the advantages of direct traceability many times in some measurement processes (such as sample stage repeatability error measurement).

The method for calibrating the parameter error of the electron probe microanalysis instrument shortens the length of the traceability chain for calibrating the instrument, reduces the error accumulation in the quantity value dissemination process, improves the calibration consistency between different instruments, is convenient to operate, and helps to achieve the flattening of quantity value dissemination. In addition, it is also of great significance to improve the accuracy of fusion measurement based on the matching of different instruments.

Embodiment 2

Based on the method for calibrating the parameter error of the electron probe microanalysis instrument in embodiment, in step S1, a one-dimensional chromium grating standard template is prepared based on chromium atom lithography technology, and the theoretical grating period D of the standard template is calculated by using a chromium atom energy level transition frequency and a preparation process principle.

Figure 2:
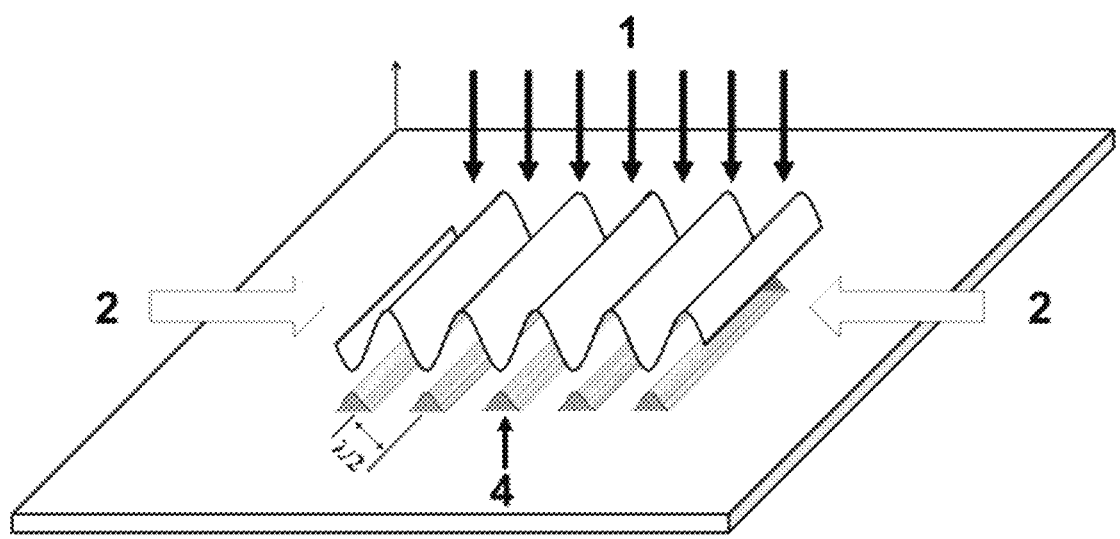
FIG. 2 illustrates a schematic diagram of a lithography process of a one-dimensional chromium grating standard template in a method for calibrating a parameter error of an electron probe microanalysis instrument according to an embodiment of the present application.

More preferably, referring to FIG. 2, preparing a one-dimensional chromium grating standard template based on chromium atom lithography technology includes the following steps:

S11: heating chromium powder to 1550-1650° C. under vacuum to reach a sublimation state, and leading out the chromium powder from a discharge hole to form a Cr atom beam; and S12: collimating the Cr atom beam through laser frequency locking and laser cooling. The collimated Cr atom beam 1 converges at a standing wave field with laser orthogonal thereto, and is deposited on a template under the action of dipole force to form the one-dimensional chromium grating standard template 4.

More preferably, in step S12, the wavelength λ of the laser 2 is 425.6 nm, the corresponding resonant transition energy level of Cr atoms is $^7S_3 \rightarrow {}^7P_4^0$, the frequency of the laser 2 is adjusted to a positive (+20 MHz) or negative (−250 MHz) detuning position of a central frequency corresponding to the resonant energy level, and thus the theoretical grating period D of the formed one-dimensional chromium grating standard template 4 is half of the wavelength λ of laser 2 and is 212.8 nm.

In the theoretical period of the standard template calculated by using the chromium atom energy level transition frequency and the preparation process principle, the period of the self-tracing grating prepared through basic chromium atom lithography is 212.8 nm, the period of the self-tracing grating prepared through polarization gradient or positive/negative detuning chromium atom lithography is 106.4 nm, and the period of the self-tracing grating prepared through one-eighth wavelength chromium atom lithography is 53.2 nm.

Embodiment 3

Figure 3:
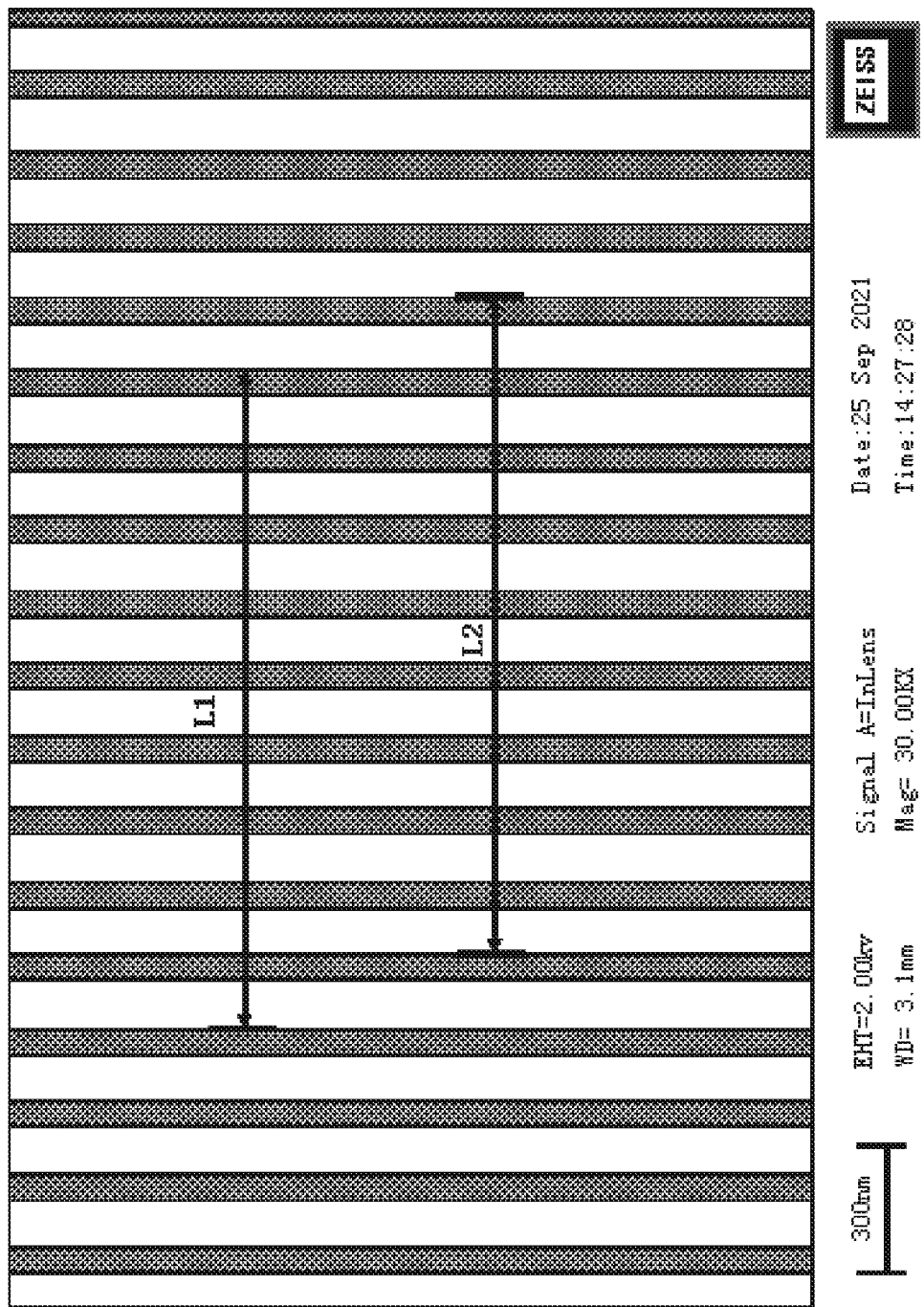
FIG. 3 illustrates a schematic diagram of measurement calibration in a method for calibrating a parameter error of an electron probe microanalysis instrument according to an embodiment of the present application.

Based on the method for calibrating the parameter error of the electron probe microanalysis instrument in embodiment 1, referring to FIG. 3, in step S3, N grid distance is selected from a front of an image of a one-dimensional chromium grating standard template as a front grating scanning distance measurement value L1, and N grid distance is selected from a rear of the image of the one-dimensional chromium grating standard template as a rear grating scanning distance measurement value L2;

the grating scanning distance measurement value L is an arithmetic average of the front grating scanning distance measurement value L1 and the rear grating scanning distance measurement value L2, that is, L=(L1+L2)/2. Several consecutive measurements (for example, 5 times) may be performed and then averaging is performed.

More preferably, in step S2, the stage is rotated and kept horizontal to help the electron beam to realize perpendicular incidence to the grating;

the grating line direction is made to be a front-rear direction, the electron probe microanalysis instrument is made to scan in a left-right direction, and a scanning direction of the electron probe microanalysis instrument is perpendicular to the grating line direction, that is, θ=0°.

The stage can be rotated to correct the angle, so that the scanning direction of the electron probe microanalysis instrument is perpendicular to the grating line direction, thus avoiding the angle error caused by the manual placement of the one-dimensional grating standard template. The actual length of the grating scanning distance measurement value L on the one-dimensional chromium grating standard template should be ND, then the calibration factor K under this magnification ratio is:

$$K = \frac{ND}{L}.$$

Under the magnification ratio of 30K× illustrated in FIG. 3, the grating scanning distance measurement value L is 2081 nm, and the actual period (D*N) of the whole measuring distance should be 212.8 nm*10=2128 nm, so the calibration factor K under this magnification ratio is 1.022.

The complete calibration process needs to be carried out in sequence under different magnification ratios, and the calibration process is the same as above.

The preferred specific embodiments of the present application are described in detail above. It should be understood that those skilled in the art may make many modifications and changes according to the concept of the present application without contributing any inventive labor. Therefore, any technical scheme that can be obtained by those skilled in the art according to the concept of the present application on the basis of the prior art through logical analysis, reasoning or limited experiments should also fall within the scope of protection determined by the claims.

What is claimed is:

1. A method for calibrating a parameter error of an electron probe microanalysis instrument, wherein the method comprises the following steps:

S1: preparing a one-dimensional grating standard template based on atom lithography technology, and calculating a theoretical grating period D of the one-dimensional grating standard template;

S2: statically placing the one-dimensional grating standard template on a stage of the electron probe microanalysis instrument for set time to make a test state remain stable;

S3: after the electron probe microanalysis instrument focuses clearly, scanning, by the electron probe microanalysis instrument, the one-dimensional grating standard template on the stage, performing image acquisition and measurement on a grid distance of the one-dimensional grating standard template to obtain a grating scanning distance measurement value L, and recording a magnification ratio at this time;

S4: performing calculation to obtain a calibration factor K of the electron probe microanalysis instrument under the magnification ratio:

$$K = \frac{ND}{L \cos \theta};$$

where θ is an included angle between a grating line direction and a scanning direction of the electron probe microanalysis instrument; N is the number of grating periods of the one-dimensional grating standard template corresponding to the grating scanning distance measurement value L, and N is a positive integer; and S5: calibrating parameters of the electron probe microanalysis instrument under the magnification ratio by using the calibration factor K.

2. The method for calibrating the parameter error of the electron probe microanalysis instrument according to claim 1, wherein:
the parameters of the electron probe microanalysis instrument to be calibrated comprise a length measurement indication error E1;

$$E1=|KL-L|/N.$$

3. The method for calibrating the parameter error of the electron probe microanalysis instrument according to claim 1, wherein:
the parameters of the electron probe microanalysis instrument to be calibrated comprise a sample stage repeatability error E2:

$$E2=K\Delta \overline{S};$$

where $\Delta \overline{S}$ is an average of center distance differences; $\Delta \overline{S}$ is obtained by:
(1) finding a marking point on the one-dimensional grating standard template by using a secondary electron image under the magnification ratio, moving the marking point to a center position of a screen, and acquiring an image after focusing clearly;
(2) moving the stage for more than a set distance S along X and Y directions respectively by relatively displacing the stage, then moving the stage back for the same distance along opposite directions, and acquiring images after focusing clearly;
(3) measuring a distance between the current center position of the screen and the marking point; and
(4) repeating steps (1)-(3) for M times, and calculating an arithmetic average of M measurement results as the average $\Delta \overline{S}$ of the center distance differences, where M is a positive integer.

4. The method for calibrating the parameter error of the electron probe microanalysis instrument according to claim 3, wherein:
M is 2, 3 or 4;

$$S>2D;$$

the magnification ratio is 80 k.

5. The method for calibrating the parameter error of the electron probe microanalysis instrument according to claim 1, wherein:
in step S5, a linear distortion a is also calculated:

$$\alpha = \frac{\Delta L_{max}}{L_0} \times 100\%;$$

where $\Delta L_{max}$ is the maximum value of differences between a single period at the center of the screen of the electron probe microanalysis instrument and single periods at four corners of the screen, and $\Delta L_{max}$ is obtained by:
(1) adjusting the magnification ratio so that the length of a single grating period at the center of the one-dimensional grating standard template is a set ratio of the maximum image size, wherein the set ratio is 8%-12%;
(2) calculating a single grating period $L_0$ of the one-dimensional grating standard template at the center of the screen and single grating periods $L_1$, $L_2$, $L_3$ and $L_4$ at the four corners of the screen; and
(3) taking the maximum value of $|\Delta L_i|$ as $\Delta L_{max}$, $\Delta L_i=L_i-L_0$, where i=1, 2, 3, 4.

6. The method for calibrating the parameter error of the electron probe microanalysis instrument according to claim 1, wherein:
during calibration, preferably the ambient temperature is (20±5)° C., the temperature fluctuation is less than or equal to 1° C./h, and the relative humidity is less than or equal to 75%.

7. The method for calibrating the parameter error of the electron probe microanalysis instrument according to claim 1, wherein:
the electron probe microanalysis instrument is a scanning electron microscope, and the parameters to be calibrated comprise a length measurement indication error.

8. The method for calibrating the parameter error of the electron probe microanalysis instrument according to claim 1, wherein:
the electron probe microanalysis instrument is an electron probe analyzer, and the parameters to be calibrated comprise a length measurement indication error and a sample stage repeatability error.

9. The method for calibrating the parameter error of the electron probe microanalysis instrument according to claim 1, wherein:
the set time is more than 10 min.

10. The method for calibrating the parameter error of the electron probe microanalysis instrument according to claim 1, wherein:
in step S1, a one-dimensional chromium grating standard template is prepared based on chromium atom lithography technology, and the theoretical grating period D of the standard template is calculated by using a chromium atom energy level transition frequency and a preparation process principle.

11. The method for calibrating the parameter error of the electron probe microanalysis instrument according to claim 10, wherein:
preparing a one-dimensional chromium grating standard template based on chromium atom lithography technology comprises the following steps:
S11: heating chromium powder to 1550-1650° C. under vacuum to reach a sublimation state, and leading out the chromium powder from a discharge hole to form a Cr atom beam; and
S12: collimating the Cr atom beam, the collimated Cr atom beam converging at a standing wave field with laser orthogonal thereto, and being deposited on a template under the action of dipole force to form the one-dimensional chromium grating standard template.

12. The method for calibrating the parameter error of the electron probe microanalysis instrument according to claim 11, wherein:
in step S12, the wavelength λ of the laser is 425.6 nm, the corresponding resonant transition energy level of Cr atoms is $^7S_3 \rightarrow ^7P_4^0$, the frequency of the laser is adjusted to a positive or negative detuning position of a central frequency corresponding to the resonant energy level, the theoretical grating period D of the formed one-dimensional chromium grating standard template is half of the wavelength λ of laser and is 212.8 nm.

13. The method for calibrating the parameter error of the electron probe microanalysis instrument according to claim 1, wherein:
in step S3, N grid distance is selected from a front of an image of a one-dimensional chromium grating standard template as a front grating scanning distance measurement value L1, and N grid distance is selected from a rear of the image of the one-dimensional chromium grating standard template as a rear grating scanning distance measurement value L2;

the grating scanning distance measurement value L is an arithmetic average of the front grating scanning distance measurement value L1 and the rear grating scanning distance measurement value L2, that is, L=(L1+L2)/2.

14. The method for calibrating the parameter error of the electron probe microanalysis instrument according to claim 1, wherein:

in step S2, the stage is rotated and kept horizontal;

the grating line direction is made to be a front-rear direction, the electron probe microanalysis instrument is made to scan in a left-right direction, and a scanning direction of the electron probe microanalysis instrument is perpendicular to the grating line direction, that is, $\theta=0°$.

* * * * *